US011940142B1

(12) United States Patent
Chen

(10) Patent No.: US 11,940,142 B1
(45) Date of Patent: Mar. 26, 2024

(54) INFLATION ASSEMBLY

(71) Applicant: Wei Chen, Langzhong (CN)

(72) Inventor: Wei Chen, Langzhong (CN)

(73) Assignee: Wei Chen (CN)

( * ) Notice: Subject to any disclaimer, the term of this patent is extended or adjusted under 35 U.S.C. 154(b) by 0 days.

(21) Appl. No.: 18/215,026

(22) Filed: Jun. 27, 2023

(51) Int. Cl.
*F21V 33/00* (2006.01)

(52) U.S. Cl.
CPC .................................. *F21V 33/008* (2013.01)

(58) Field of Classification Search
CPC ....... F21S 33/00; F21S 33/008; F21S 33/0084
See application file for complete search history.

(56) References Cited

U.S. PATENT DOCUMENTS 4,636,230 A * 1/1987 Fan ..................... F21V 33/0088 15/345
4,656,687 A * 4/1987 Wei ........................... A47L 5/24 15/324
4,776,766 A * 10/1988 Brent .................... F21V 33/008 362/191
4,789,310 A * 12/1988 Hung .................. F21V 33/0088 417/313
5,568,117 A * 10/1996 Hsu .......................... B60Q 3/30 417/234
7,789,112 B1 * 9/2010 Wise ....................... B60S 5/046 141/38
2008/0286124 A1 * 11/2008 Sen ......................... F21L 4/027 417/313
2011/0129369 A1 * 6/2011 Potratz .................. F04D 29/522 417/410.1
2012/0168030 A1 * 7/2012 Ohm ....................... F04B 35/06 141/94
2013/0052060 A1 * 2/2013 Meza ...................... F04B 17/03 417/411
2015/0252809 A1 * 9/2015 Tsai ..................... A47C 27/083 417/44.2
2015/0322935 A1 * 11/2015 Wang .................... F04B 33/005 417/415
2019/0120216 A1 * 4/2019 Wang ...................... F04B 35/01
2020/0112002 A1 * 4/2020 Chen ................... H01M 50/247

* cited by examiner

*Primary Examiner* — Alexander K Garlen
(74) *Attorney, Agent, or Firm* — Dickinson Wright PLLC

(57) ABSTRACT

Provided is an inflation assembly, which relates to the technical field of inflation technology, and includes a housing, a circuit board, a battery pack, an inflation pump, and a lighting lamp. The circuit board, the battery pack, the inflation pump, and the lighting lamp are all connected to the housing, the inflation pump, the lighting lamp, and the battery pack are all electrically connected to the circuit board; and a gas outlet of the inflation pump is exposed outside the housing.

13 Claims, 8 Drawing Sheets

INFLATION ASSEMBLY

CROSS-REFERENCE TO RELATED APPLICATION(S)

This application claims priority to Chinese Patent Application No. 2023200585325 filed Jan. 9, 2023, the disclosure of which is incorporated herein by reference in its entirety.

TECHNICAL FIELD

The present disclosure relates to the technical field of inflation, and more particularly, to an inflation assembly

BACKGROUND ART

With the improvement in living standards, people use inflatable products more and more frequently. Due to the characteristics of inflatable products, they can adapt to different environments, and have high convenience and good experience. The inventor found that in the existing technology, an inflation pump is used to inflate inflatable products. There are generally two forms for the inflation pump, one is an independent product, which is independent of the inflatable product, and when in use, is connected to the inflatable product and then inflates the inflatable product; the other is directly configured on the inflatable product and becomes a part thereof, and the inflatable product can be inflated after starting the inflation pump during use. However, whether the inflation pump is an independent form or an integrated form of inflatable products, the function thereof is very simple, that is, it can only perform inflation operations.

SUMMARY

The purpose of the present disclosure is to provide an inflation assembly, which is capable of enhancing the functions of an inflation pump, to extend application range of the inflation pump wider, and make it have strong ability to adapt to the environment.

The embodiments of the present disclosure are implemented as follows:

The present disclosure provides an inflation assembly, including:

a housing, a circuit board, a battery pack, an inflation pump, and a lighting lamp, wherein the circuit board, the battery pack, the inflation pump, and the lighting lamp are all connected to the housing, the inflation pump, the lighting lamp, and the battery pack are all electrically connected to the circuit board; and a gas outlet of the inflation pump is exposed outside the housing.

In an optional implementation mode, the housing consists of a bracket and two half housings, wherein the two half housings are butted to each other and jointly define an accommodating chamber, and the bracket is provided in the accommodating chamber, wherein the battery pack and the inflation pump are both provided on the bracket.

In an optional implementation mode, a transparent hole is provided on a side wall of at least one of the half housings, and the lighting lamp is provided at the transparent hole.

In an optional implementation mode, wherein the housing further includes a handle, which is rotatably connected to the half housings, to switch between a folding position and an unfolding position.

In an optional implementation mode, the inflation pump further includes a battery-level display module, and the battery-level display module is electrically connected to the circuit board and configured for displaying battery-level of the battery pack; or the inflation pump further includes an annular lamp strip, wherein the annular lamp strip is arranged around the housing, and the annular lamp strip is electrically connected to the circuit board; or the inflation pump further includes at least one of a charging connector and a discharging connector, and the charging connector and the discharging connector are both electrically connected to the circuit board.

In an optional implementation mode, the inflation assembly further includes an adapter pipe head, the adapter pipe head is detachably connected to the housing, the adapter pipe head is in communication with the gas outlet, and the adapter pipe head is configured for corresponding and connecting to an inflation hole of an inflatable product.

In an optional implementation mode, the inflation assembly further includes a fixed housing, the fixed housing is provided with a receiving groove and a through hole communicating with the receiving groove, wherein the housing is inserted into the receiving groove, and the gas outlet is in communication with the through hole; and the fixed housing is configured for being fixedly connected to an inflatable product.

In an optional implementation mode, an enclosing cover configured for opening or closing an opening of the receiving groove is provided on the fixed housing.

In an optional implementation mode, wherein the fixed housing is provided with a deflation hole; and the inflation assembly further includes a deflation unit, the deflation unit is connected to the fixed housing, and the deflation unit is configured for opening or closing the deflation hole.

In an optional implementation mode, the deflation unit includes a one-way valve sheet and a driving mechanism, wherein the one-way valve sheet is connected to the fixed housing, for only allowing gas to be exhausted from the fixed housing through the deflation hole; and the driving mechanism is provided on the fixed housing, wherein the driving mechanism is connected to the one-way valve sheet, and configured for driving the one-way valve sheet to move to open the deflation hole.

The beneficial effects of the embodiments of the present disclosure are:

In conclusion, for the inflation assembly provided by the embodiments, the inflation pump is integrated inside the housing, and meanwhile, the battery pack and the lighting lamp are provided on the housing. In this way, the battery pack may directly power the inflation pump and the lighting lamp. When using the inflation pump, there is no need for external power, and it is less affected by environmental factors, making it flexible and versatile to use. As for the design of the lighting lamp, it may be turned on to provide light in some cases, to increase the safety of actions in darkness or poor-light environment. The inflation assembly not only has the inflation function, but also has the lighting function, and has its own battery. The functions are diversified, and the use is convenient and flexible.

BRIEF DESCRIPTION OF DRAWINGS

In order to more clearly explain the technical solution in the embodiments of the present disclosure, the following content will be used to briefly introduce the drawings illustrated in the embodiments. It should be understood that the following drawings only illustrate some embodiments of the present disclosure and should not be regarded as a limitation of the scope, and for ordinary skilled in the field, they can also obtain other relevant drawings according to these drawings without paying for any creative work.

Figure 1:
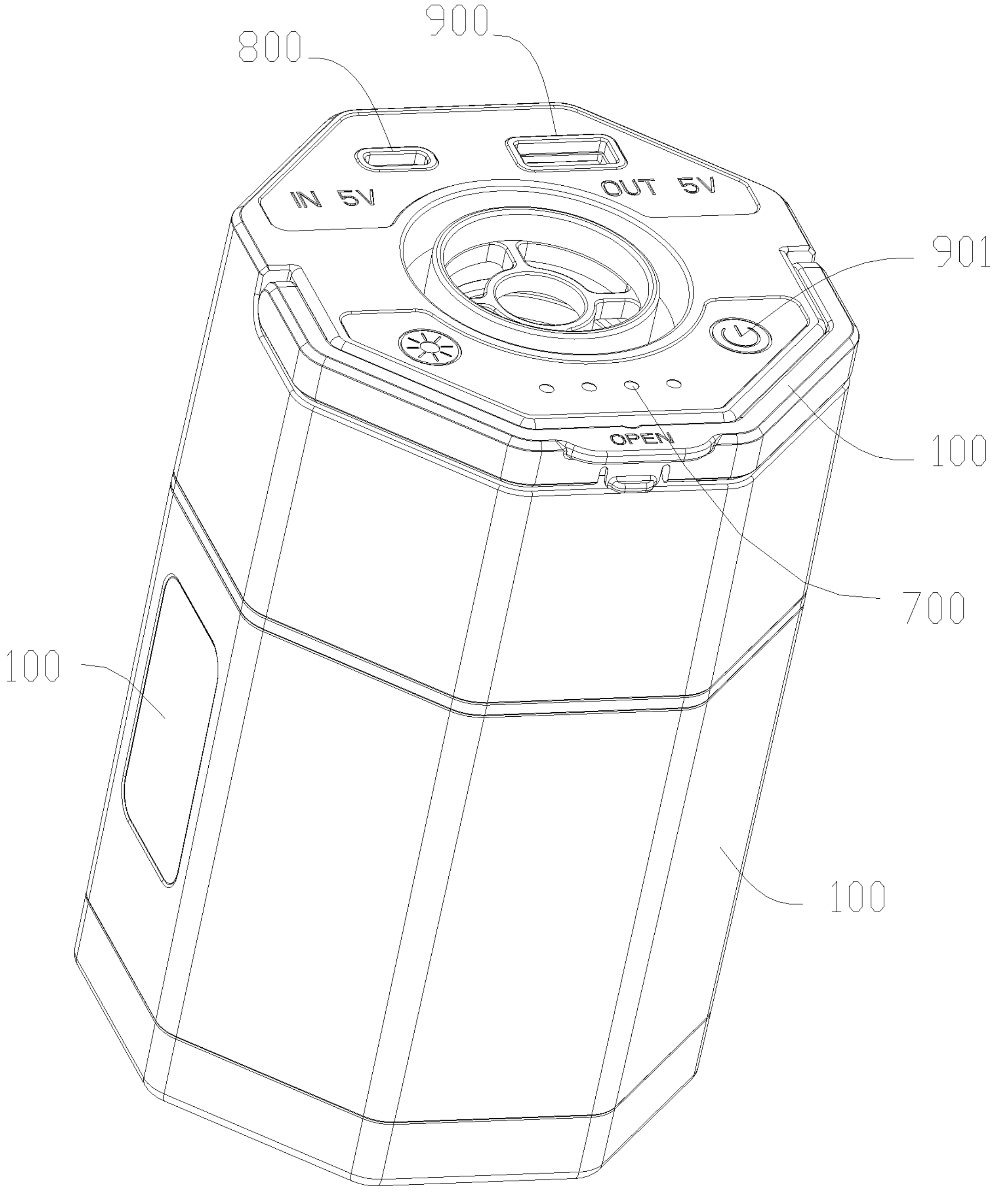
FIG. 1 is a structural schematic diagram of an inflation assembly of the embodiments of the present disclosure.

Reference signs:

100—housing; 110—first half-housing; 111—transparent hole; 120—second half-housing; 130—bracket; 131—positioning ring; 132—substrate; 133—orientation foot; 134—first accommodating groove; 135—second accommodating groove; 140—lampshade; 150—panel; 160—handle; 200—circuit board; 300—battery pack; 400—inflation pump; 410—one-way valve; 500—lighting lamp; 600—annular lamp strip; 700—battery-level display module; 800—charging connector; 900—discharging connector; 901—key board; 902—adapter pipe head; 903—fixed housing; 9031—first receiving groove; 9032—second receiving groove; 904—enclosing cover; 905—one-way valve sheet; 906—driving mechanism; 9061—backstop cover; 9062—transposition frame; 9063—rotation shaft; 9064—transmission member; 9065—key cover; 9066—sealing ring; 9067—first guiding slope; 9068—second guiding slope; 907—mounting frame.

DETAILED DESCRIPTION OF EMBODIMENTS

In order to make the purpose, technical solution, and advantages of the embodiments of the present disclosure clearer, the following will combine the drawings of the embodiments of the present disclosure to describe the technical solution of the embodiments of the present disclosure clearly and completely. Obviously, the described embodiment is a part of the embodiments of the present disclosure, but not all of the embodiments. Generally, the components of the embodiments of the present disclosure described and shown in the attached drawings may be arranged and designed in various configurations.

Therefore, the following detailed description of the embodiments of the present disclosure provided in the attached figures is not intended to limit the protection scope required by the present disclosure, but only to represent the selected embodiments of the present disclosure. Based on the embodiments in the present disclosure, all other embodiments obtained by ordinary technicians in this field without making creative labor belong to the protection scope of the present disclosure.

It should be noted that similar labels and letters represent similar items in the following figures. Therefore, once an item is defined in one drawing, it does not need to be further defined and explained in the subsequent drawings.

In the description of the present disclosure, it should be noted that the orientation or positional relationship indicated by the terms "center", "upper", "lower", "left", "right", "vertical", "horizontal", "inner", "outer", etc. is based on the orientation or positional relationship shown in the attached drawings, or is the orientation or positional relationship usually placed when the product of the present disclosure is used, only for facilitating the description of the present disclosure and simplify the description, instead of indicating or implying that the device or element must have a specific orientation, and be constructed and operated in a specific orientation, therefore it cannot be understood as a restriction on the present disclosure. In addition, terms such as "first", "second", "third", etc. are only used to distinguish descriptions, and cannot be understood as indicating or implying relative importance.

In addition, terms such as "horizontal" and "vertical" do not mean that a component is required to be absolutely horizontal or drape, but can be tilted slightly. For example, "horizontal" simply means that its direction is more horizontal than "vertical". It does not mean that the structure must be completely horizontal, but can be slightly tilted.

In the description of the present disclosure, it is also necessary to note that, unless otherwise expressly specified and limited, the terms "provision", "installation", "connection" and "linkage" shall be understood broadly. For example, they may be a fixed connection, a detachable connection, or integrated connection; can be a mechanical connection, or an electrical connection; can be direct connection, indirect connection through an intermediary, or communication within two elements. For ordinary technical personnel in the field, the specific meanings of the above terms in the present disclosure can be understood according to specific circumstances.

At present, when the inflation pump 400 is used, it only has the function of charging the inflatable product. The function is single, the use mode is single, and the ability to adapt to the environment is poor.

In view of this, the designer provides an inflation assembly, which has the functions of both inflation and lighting. The functions are diversified and the use is flexible and convenient.

Figure 2:
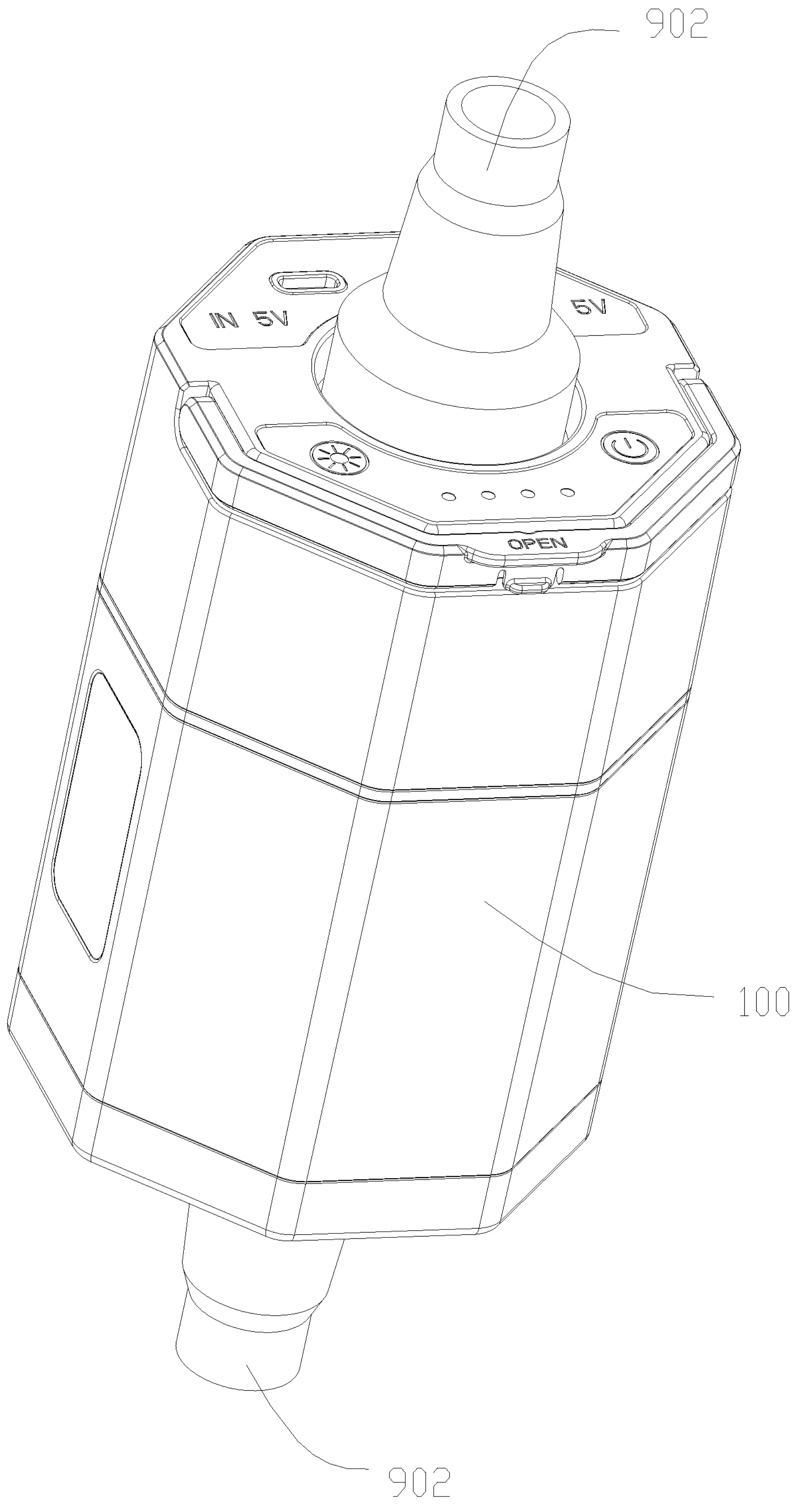
FIG. 2 is a structural schematic diagram of a deformation example of the inflation assembly of the embodiments of the present disclosure.
Figure 3:
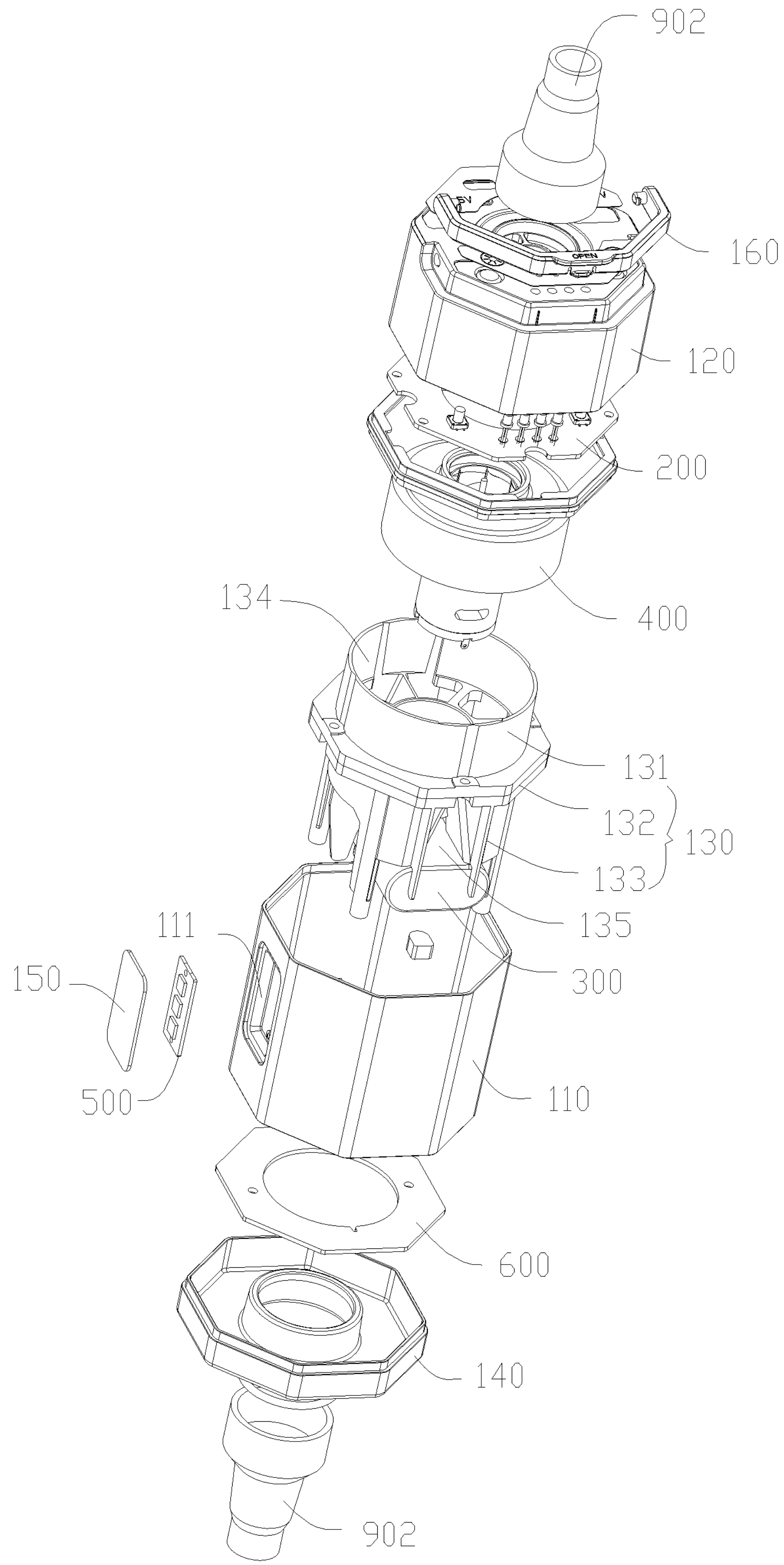
FIG. 3 is a decomposed structural schematic diagram of the inflation assembly of the embodiments of the present disclosure.

Please refer to FIG. 1 to FIG. 3. In the present embodiment, the inflation assembly includes a housing 100, a circuit board 200, a battery pack 300, an inflation pump 400, and a lighting lamp 500. The circuit board 200, the battery pack 300, the inflation pump 400, and the lighting lamp 500 are all connected to the housing 100. The inflation pump 400, the lighting lamp 500, and the battery pack 300 are all electrically connected to the circuit board 200. A gas outlet of the inflation pump 400 is exposed outside the housing 100.

The use mode of the inflation assembly provided in the present embodiment is as follows:

The inflation pump 400 may be connected to the inflation hole of the inflatable product directly or through a connector by using the gas outlet, then, the inflation pump 400 is started, the inflation pump 400 is supplied with electrical energy by the battery pack 300, to make the inflation pump 400 operate and inflate the interior of the inflatable product through the inflation hole. After the inflation is completed, the inflation pump 400 is closed. Meanwhile, in some scenarios, the lighting lamp 500 may be turned on to provide illumination. It should be understood that the inflatable product may be an inflatable bed, an inflatable pool, an inflatable toy, etc.

In the present embodiment, the inflation assembly not only has the basic function of inflation, but also is capable of providing illumination, the functions are diversified, and the use is convenient and flexible.

In the present embodiment, the housing 100 is provided as a split structure, which is convenient for processing and manufacturing, and is also convenient to assemble components such as the circuit board 200, the battery pack 300, the inflation pump 400, and the lighting lamp 500 at corresponding position of the housing 100, which reduces the assembly difficulty and improves the assembly efficiency.

Please refer to FIG. 3, for example, the housing 100 includes a first half-housing 110, a second half-housing 120, a bracket 130, a lampshade 140, a panel 150, and a handle 160. The first half-housing 110 is butt-jointed with the second half-housing 120, and they define a columnar accommodating chamber together. The bracket 130 includes a positioning ring 131, a substrate 132, and a plurality of positioning feet 133, all of which are integrated as a whole. The positioning ring 131 and a plurality of the positioning feet 133 are both connected to the substrate 132 and located at the two sides of the substrate 132. The positioning ring 131 and the substrate 132 jointly form a first accommodating groove 134, and an avoidance through hole is provided on the substrate 132, wherein the avoidance through hole is located on the bottom wall of the first accommodating groove 134. A plurality of the positioning feet 133 are evenly arranged at intervals in a circumferential direction of the substrate 132, and a plurality of the positioning feet 133 cooperate with the substrate 132 to define a second accommodating groove 135. An inflation pump 400 is embedded in the first accommodating groove 134, a tube body provided with a gas outlet of the inflation pump 400 is inserted into the avoidance hole, and a battery pack 300 is embedded in the second accommodating groove 135. The bracket 130 is provided in the accommodating chamber and is clamped and fixed by the first half-housing 110 and the second half-housing 120, so as to restrict the bracket 130 from shaking in an axial direction of the accommodating chamber. By separating the battery pack 300 from the inflation pump 400, the assemblies of the two do not interfere with each other, and the heat generated by the operation of the battery pack 300 is prevented from directly affecting the use of the inflation pump 400. Furthermore, the structural design of a plurality of the supporting feet not only has the function of supporting the substrate 132, but also may be used as a heat dissipation structure, so that the heat generated during the operation of the battery pack 300 is easily transmitted through the first half-housing 110 and the second half-housing 120. Meanwhile, a transparent hole 111 is formed on a circumferential wall of the first half-housing 110, the lighting lamp 500 is mounted on the first half-housing 110, and light emitted by the lighting lamp 500 can be transmitted out through the transparent hole 111, thereby implementing lighting. For example, the lighting lamp 500 may be directly mounted in the transparent hole 111. Alternatively, the lighting lamp 500 is mounted in the accommodating chamber, and the panel 150 is provided at the transparent hole 111, wherein the panel 150 is a transparent plate, for example, the panel 150 is a plastic plate or a glass plate, etc., so that the lighting lamp 500 may be effectively protected, and the probability that the lighting lamp 500 is damaged is reduced.

Optionally, an end of the first half-housing 110 away from the second half-housing 120 may be an open end, the lampshade 140 is mounted at the open end of the first half-housing 110, the gas outlet of the inflation pump 400 extends out of the lampshade 140, the lampshade 140 is an annular member, and the lampshade 140 may be fixedly connected to the first half-housing 110 by a screw. An annular lamp strip 600 is fitted in the lamp shade 140, the annular lamp strip 600 is arranged around the first half-housing 110, the annular lamp strip 600 is electrically connected to the battery pack 300, and light emitted by the annular lamp strip 600 can be emitted out through the lamp shade 140. Each of a plurality of the supporting feet may be abutted to the lampshade 140.

The handle 160 is mounted on the top of the second half-housing 120, the handle 160 is rotatably connected to the second half-housing 120, and the second half-housing 120 is provided with an accommodating groove. During a rotation process of the handle 160, a folding position and an unfolding position switching to each other are provided. When the handle 160 is in the folding position, it is embedded in the accommodating groove; and when the handle 160 is in the unfolding position, it is arranged substantially perpendicular to the second half-housing 120. By holding the handle 160, it is convenient to move and use the inflation assembly. When the lighting lamp 500 is turned on, it is convenient to adjust the lighting angle.

It should be understood that a flexible sleeve may be provided on the handle 160 to improve comfort. Moreover, when the handle 160 is in the folding position, the flexible sleeve on the handle 160 may be press-fitted with the wall of the receiving groove, thus improving the stability of the handle 160 when it is in the folding position.

Please refer to FIG. 1, in the present embodiment, optionally, the inflation pump 400 further includes a battery-level display module 700, a charging connector 800, and a discharging connector 900, which are all assembled on the top of the second half-housing 120, and the battery-level display module 700, the charging connector 800, and the discharging connector 900 are all electrically connected to the circuit board 200. It should be understood that the battery-level display module 700 may be lighted in response to the number of lighted lamps, and the higher the number of lighted lamp, the more sufficient the battery-level, or the battery-level display module 700 may be an RGB tri-color lamp, and the battery-level display module 700 may display the remaining battery-level of the battery pack 300 in real time, so as to charge the battery pack 300 in time. The discharge connector 900 may be a USB socket or the like.

In addition, a key board 901 may be provided on the outer surface of the top of the second half-housing 120, the key board 901 is electrically connected to the circuit board 200, a waterproof film may be provided on the key board 901, and a plurality of keys are provided on the key board 901, including but not limited to a key for controlling start and stop of the inflation pump 400, a switch key for controlling the lighting lamp 500, a switch key for controlling the annular lamp strip 600, and a switch key for controlling the battery pack 300.

Please refer to FIG. 2 or FIG. 3, in the present embodiment, optionally, the inflation assembly further includes adapter pipe heads 902. There may be a plurality of models of the adapter pipe heads 902. One end of each of the adapter pipe heads 902 may be connected to the gas outlet, and the other end can be connected to the inflation hole of the inflatable product. In this way, by changing models of the adapter pipe heads 902, different models of inflatable products may be inflated by the inflation assembly, thereby providing a wide range of use.

Figure 4:
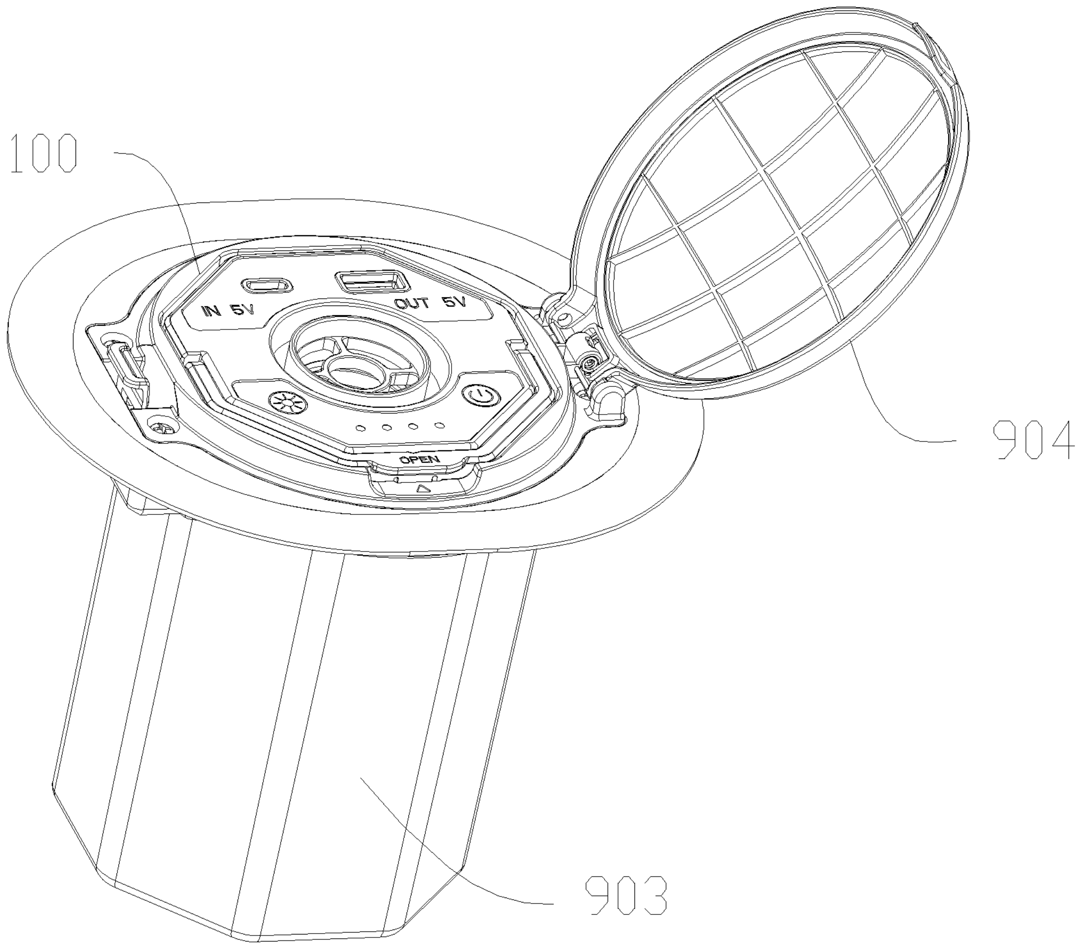
FIG. 4 is a structural schematic diagram of another deformation example of the inflation assembly of the embodiments of the present disclosure.
Figure 5:
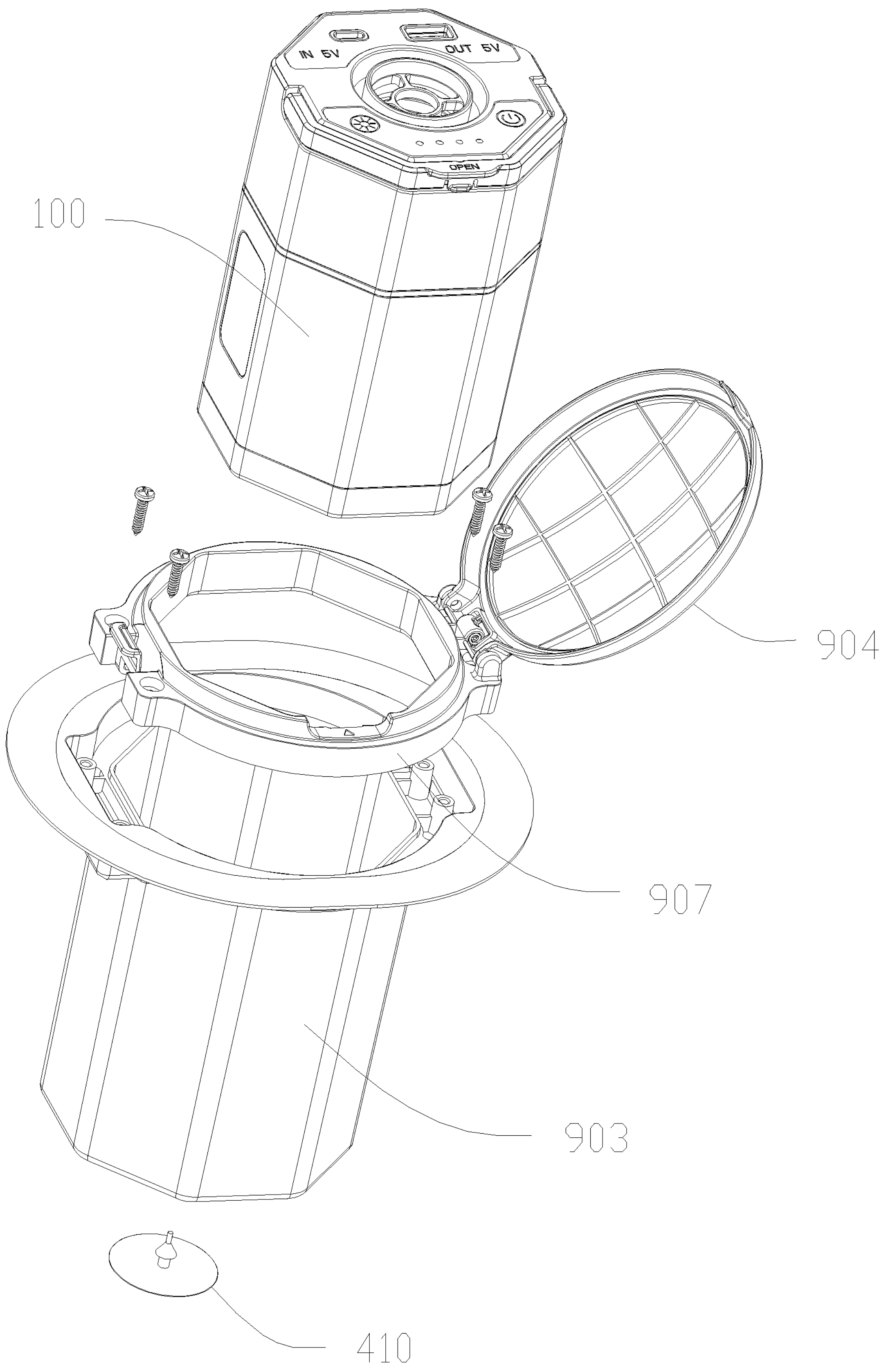
FIG. 5 is a decomposed structural schematic diagram corresponding to FIG. 4.

Please refer to FIG. 4 and FIG. 5, in the present embodiment, optionally, the inflation assembly further includes a fixed housing 903. The fixed housing 903 is provided with a first receiving groove 9031 and a through hole located on the bottom wall of the first receiving groove 9031. The housing 100 is inserted into the first receiving groove 9031, and a gas outlet of the inflation pump 400 is in communication with the through hole. The fixed housing 903 may be directly fixed on the inflatable product, so that the inflation assembly is positioned on the inflatable product, and the inflation assembly and the inflatable product are of an integrated structure, thereby facilitating the inflation operation of the inflatable product. Obviously, an enclosing cover 904 may be provided at an opening of the first receiving groove 9031, the enclosing cover 904 is rotatably connected to the fixed housing 903, and the enclosing cover 904 may, during the rotation, open or close the opening of the first receiving groove 9031. When in normal use, the enclosing cover 904 is in a closed state, and the housing 100 cannot escape from the first receiving groove 9031, so that the safety is high. Moreover, the housing 100 is limited by the enclosing cover 904, and the gas outlet of the inflation pump 400 is in good butt-joint with the inflation hole of the inflatable product, so that gas leakage is not easy to be generated. It should be understood that, a one-way valve 410 may be provided at the gas outlet of the inflation pump 400 or the inflation hole of the inflatable product, and the one-way valve 410 only allows external gas to enter the inflatable product. When the inflation pump 400 needs maintenance or inspection, the enclosing cover 904 may be opened to take out the housing 100 from the first receiving groove 9031, and the operation is convenient. Alternatively, when the inflation pump 400 and the lighting lamp 500 need to be used independently, the housing 100 may also be taken out from the first receiving groove 9031, which has a powerful function and is flexible and convenient to use.

It should be understood that, the enclosing cover 904 may be a transparent cover, which facilitates observing a working state of the battery-level display module 700 through the enclosing cover 904, thereby facilitating visual acquisition of a use state of the battery pack 300. The enclosing cover 904 may be connected to a fixed seat through the mounting frame 907, and the mounting frame 907 is fixedly connected to the fixed seat through screws or nuts, two through holes in communication with the first receiving groove 9031 and the second receiving groove 9032 are provided on the mounting frame 907, respectively. The enclosing cover 904 is rotatably connected to the mounting frame 907, and is configured for opening or closing the through holes that are in communication with the first receiving groove 9031, thus the opening or closing of the opening of the first receiving groove 9031 is indirectly realized.

In addition, the fixed housing 903 may be fixed on the inflatable product by thermoplastics means or the like.

Figure 6:
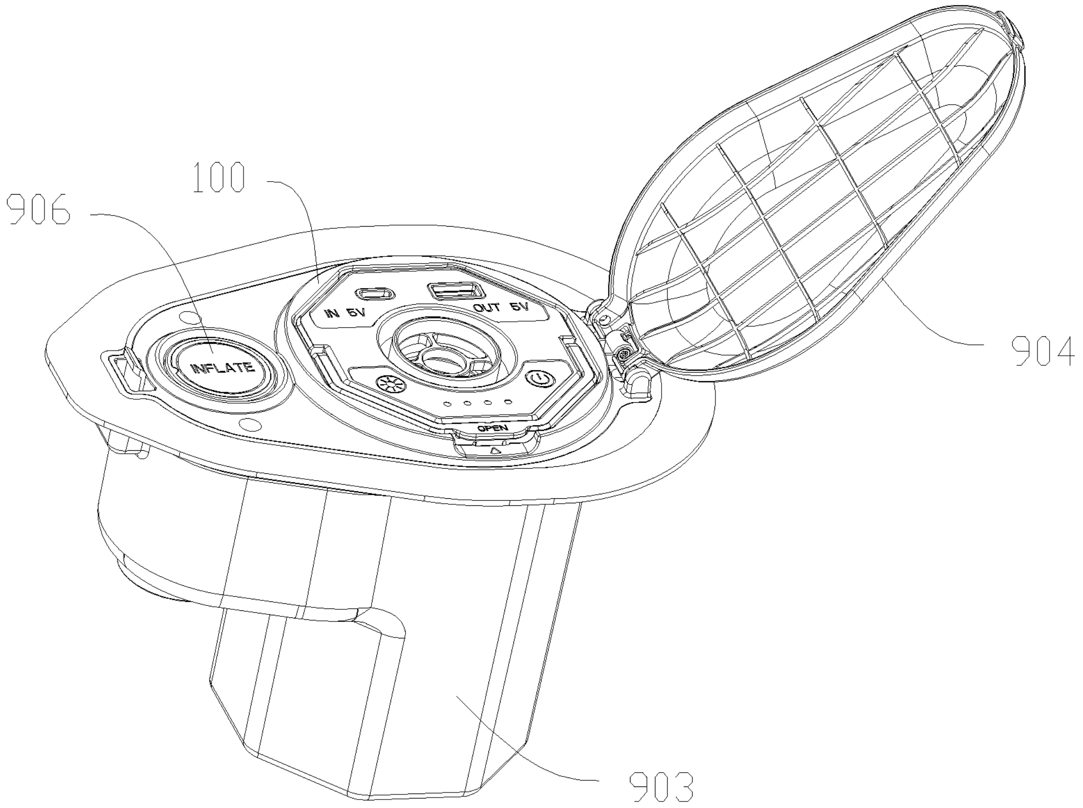
FIG. 6 is a structural schematic diagram of still another deformation example of the inflation assembly of the embodiments of the present disclosure.
Figure 7:
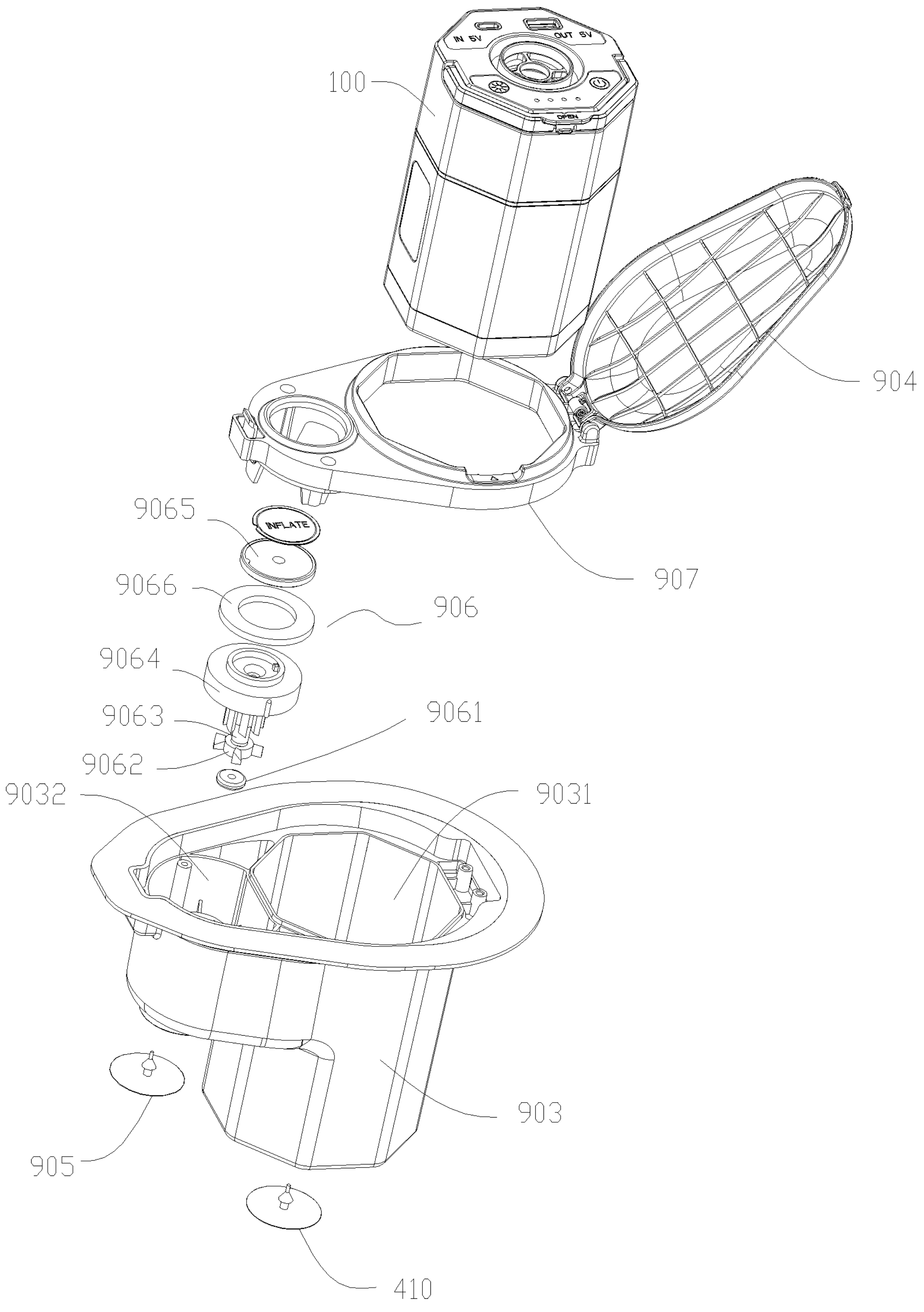
FIG. 7 is a decomposed structural schematic diagram corresponding to FIG. 6.
Figure 8:
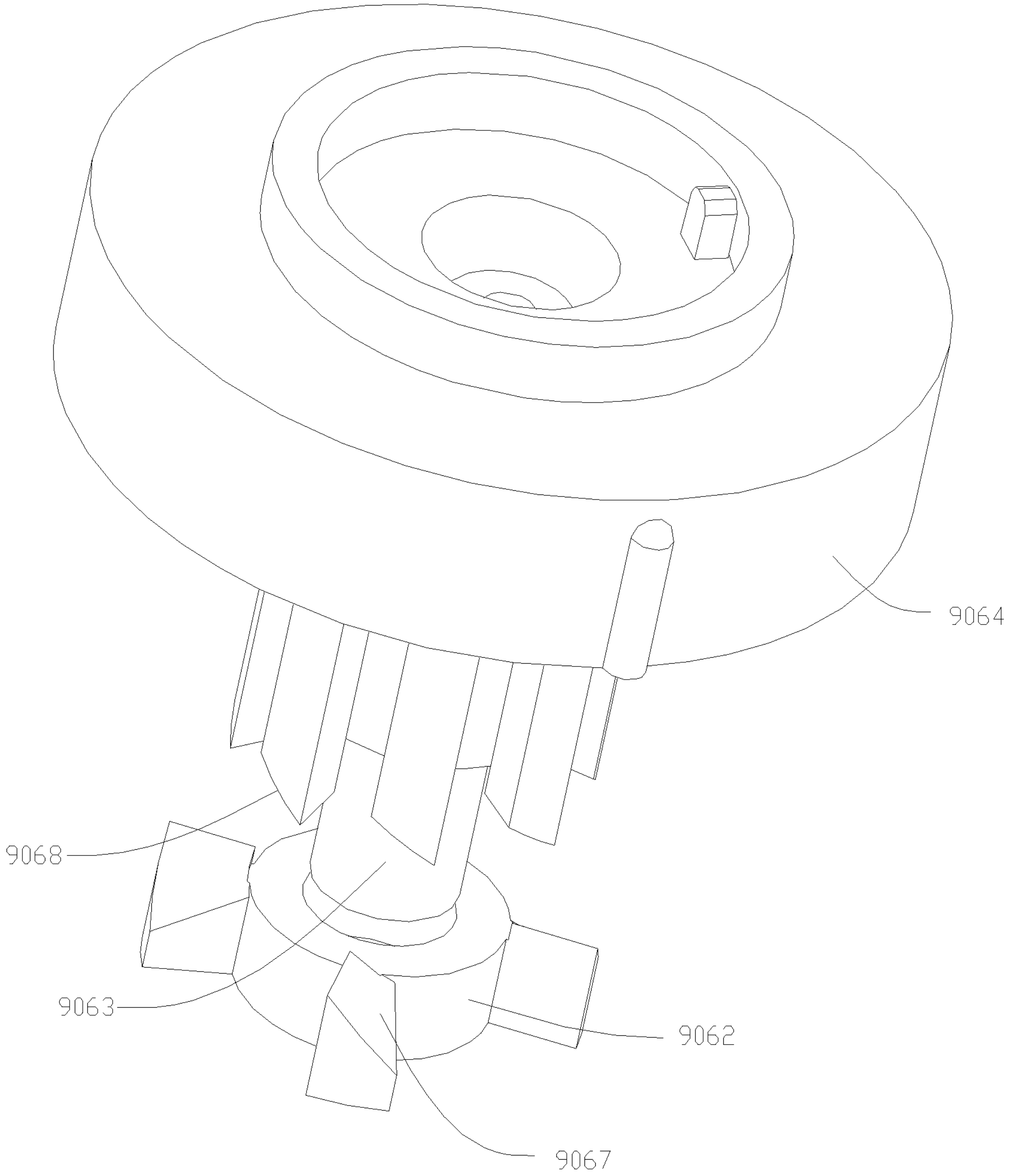
FIG. 8 is a partial structural schematic diagram of a driving mechanism of the embodiments of the present disclosure.

Please refer to FIG. 6 to FIG. 8, in the present embodiment, optionally, the second receiving groove 9032 is further provided on the fixed housing 903, and the bottom wall of the second receiving groove 9032 is formed with a deflation hole. Meanwhile, the inflation assembly further includes a deflation unit. The deflation unit is provided in the second receiving groove 9032, and the deflation unit is configured for opening or closing the deflation hole. When the fixed housing 903 cooperates with the inflatable product, the deflation hole is aligned with the exhaust hole, and when the deflation hole is opened, the gas in the inflatable product may be exhausted from the second receiving groove 9032 through the deflation hole.

Optionally, the deflation unit includes a one-way valve sheet 905 and a driving mechanism 906. The driving mechanism 906 includes a backstop cover 9061, a transposition frame 9062, a rotation shaft 9063, a torsion spring (not shown), a transmission member 9064, a key cover 9065, and a sealing ring 9066. The one-way valve sheet 905 is connected to the backstop cover 9061, the backstop cover is connected to the transposition frame 9062, the one-way valve sheet 905 is adhered to the outer surface of the fixing housing 903, and the one-way valve sheet 905 only allows the gas in the second receiving groove 9032 to be exhausted from the deflation hole. In other words, when the inflatable product is inflated, the pressure at the exhaust hole acts on the one-way valve sheet 905, such that the one-way valve sheet 905 is affixed to the outer surface of the fixed seat, thereby closing the deflation hole. The transposition frame 9062 is connected to the rotation shaft 9063 through the torsion spring, the torsion spring enables the transposition frame 9062 to have a tendency to rotate in a first direction relative to the rotation shaft 9063, and the transposition frame 9062 and the rotation shaft 9063 are relatively fixed in an axial direction of the rotation shaft 9063. The transposition frame 9062 is provided with a plurality of first guiding slopes 9067 spaced evenly around the rotation shaft 9063. The rotation shaft 9063 is inserted into the transmission member 9064, the transmission member 9064 is slidably connected to the fixed seat in the axial direction of the rotation shaft 9063, wherein the transmission member 9064 is provided with a plurality of pressing arms, the number of the pressing arms is the same as the number of first guide slopes 9067, and each of the pressing arms is provided with a second guide slope 9068. The first guiding slopes 9067 are affixed to the second guiding slopes 9068, and under the action of the torsion spring, the elastic force of the torsion spring is transmitted to the second guiding slopes 9068 through the first guiding slopes 9067, so that the transmission member 9064 has a tendency to move away from the one-way valve sheet 905. Meanwhile, the key cover 9065 is connected to the transmission member 9064, a sealing ring 9066 is provided therebetween, and the key cover 9065 abuts against the inner side surface of the mounting frame 907. Furthermore, the key cover 9065 and the fixed seat are relatively fixed in a circumferential direction of the rotation shaft 9063, that is, the key cover 9065 may not rotate relative to the fixed seat. In a normal state, the key cover 9065 is maintained at a position abutting against the mounting frame 907, and the deflation hole is closed by the one-way valve sheet 905 under the action of air pressure. When it is required to exhaust gas in the inflatable product, a force is applied to the key cover 9065, so as to make it move close to the transposition frame 9062. In the initial state, the transposition frame 9062 rotates in a second direction opposite to the first direction under the cooperation of the second guiding slopes 9068 and the first guiding slopes 9067, after rotating a predetermined angle, the torsion spring is fully compressed and has the maximum elasticity, then a force is continued to be applied to the key cover 9065, so that the transposition frame 9062 and the backstop cover is further drove to move downwards together, the one-way valve sheet 905 is pushed away, and the deflation hole is opened, so as to realize deflation. After the external force is withdrawn, under the action of the torsion spring, the transposition frame 9062 rotates towards the first direction, so that the key cover 9065 and the one-way valve sheet 905 are reset.

In the present embodiment, the inflation assembly is provided with functions such as inflation, lighting, and battery discharging at the same time, is flexible and convenient to use, and has a wide range of use.

The above is only a preferred embodiment of the present disclosure and shall not be used to restrict the present disclosure. For the technical personnel in the field, the present disclosure may be subject to various changes and variations. Any modification, equivalent substitution, improvement, etc. made within the spirit and principles of the present disclosure shall be included in the scope of protection of the present disclosure.

What is claimed is:

1. An inflation assembly, comprising:

a housing, a circuit board, a battery pack, an inflation pump, and a lighting lamp, wherein the circuit board, the battery pack, the inflation pump, and the lighting lamp are all connected to the housing, and the inflation pump, the lighting lamp, and the battery pack are all electrically connected to the circuit board; and a gas outlet of the inflation pump is exposed outside the housing;

wherein the inflation assembly further comprises a fixed housing, the fixed housing is provided with a receiving groove and a through hole communicating with the receiving groove, wherein the housing is inserted into the receiving groove, and the gas outlet is in communication with the through hole; and the fixed housing is configured for being fixedly connected to an inflatable product.

2. The inflation assembly according to claim 1, wherein the housing consists of a bracket and two half housings, wherein the two half housings are butted to each other and jointly define an accommodating chamber, and the bracket is provided in the accommodating chamber, wherein the battery pack and the inflation pump are both provided on the bracket.

3. The inflation assembly according to claim 2, wherein a transparent hole is provided on a side wall of at least one of the half housings, and the lighting lamp is provided at the transparent hole.

4. The inflation assembly according to claim 2, wherein the housing further comprises a handle, which is rotatably connected to the half housings, so as to switch between a folding position and an unfolding position.

5. The inflation assembly according to claim 1, wherein the inflation pump further comprises a battery-level display module, and the battery-level display module is electrically connected to the circuit board and configured for displaying a battery-level of the battery pack; or the inflation pump further comprises an annular lamp strip, wherein the annular lamp strip is arranged around the housing, and the annular lamp strip is electrically connected to the circuit board; or the inflation pump further comprises at least one of a charging connector and a discharging connector, and the at least one charging connector and the discharging connector are both electrically connected to the circuit board.

6. The inflation assembly according to claim 1, wherein the inflation assembly further comprises an adapter pipe head, the adapter pipe head is detachably connected to the housing, the adapter pipe head is in communication with the gas outlet, and the adapter pipe head is configured for butt-jointing with an inflation hole of an inflatable product.

7. The inflation assembly according to claim 1, wherein an enclosing cover configured for opening or closing an opening of the receiving groove is provided on the fixed housing.

8. The inflation assembly according to claim 7, wherein the fixed housing is provided with a deflation hole; and the inflation assembly further comprises a deflation unit, wherein the deflation unit is connected to the fixed housing, and the deflation unit is configured for opening or closing the deflation hole.

9. The inflation assembly according to claim 8, wherein the deflation unit comprises a one-way valve sheet and a driving mechanism, wherein the one-way valve sheet is connected to the fixed housing, for only allowing gas to be exhausted from the fixed housing through the deflation hole; and the driving mechanism is provided on the fixed housing, wherein the driving mechanism is connected to the one-way valve sheet, for driving the one-way valve sheet to move to open the deflation hole.

10. The inflation assembly according to claim 2, wherein the inflation assembly further comprises an adapter pipe head, the adapter pipe head is detachably connected to the housing, the adapter pipe head is in communication with the gas outlet, and the adapter pipe head is configured for butt-jointing with an inflation hole of an inflatable product.

11. The inflation assembly according to claim 3, wherein the inflation assembly further comprises an adapter pipe head, the adapter pipe head is detachably connected to the housing, the adapter pipe head is in communication with the gas outlet, and the adapter pipe head is configured for butt-jointing with an inflation hole of an inflatable product.

12. The inflation assembly according to claim 4, wherein the inflation assembly further comprises an adapter pipe head, the adapter pipe head is detachably connected to the housing, the adapter pipe head is in communication with the gas outlet, and the adapter pipe head is configured for butt-jointing with an inflation hole of an inflatable product.

13. The inflation assembly according to claim 5, wherein the inflation assembly further comprises an adapter pipe head, the adapter pipe head is detachably connected to the housing, the adapter pipe head is in communication with the gas outlet, and the adapter pipe head is configured for butt-jointing with an inflation hole of an inflatable product.

* * * * *